United States Patent
Park

(10) Patent No.: US 8,115,980 B2
(45) Date of Patent: Feb. 14, 2012

(54) LIGHT SCANNING UNIT, IMAGE FORMING APPARATUS HAVING THE SAME, AND SYNCHRONIZING SIGNAL CALIBRATING METHOD OF THE LIGHT SCANNING UNIT

(75) Inventor: Young-jin Park, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 12/480,141

(22) Filed: Jun. 8, 2009

(65) Prior Publication Data
US 2010/0060967 A1    Mar. 11, 2010

(51) Int. Cl.
*G02B 26/08*    (2006.01)
(52) U.S. Cl. .................... 359/199.1; 359/212.1; 250/234
(58) Field of Classification Search ............... 359/199.1, 359/223–226.1, 212.1–214.1, 871; 250/234–236; 347/250, 260
See application file for complete search history.

(56) References Cited

U.S. PATENT DOCUMENTS

| | | | | |
|---|---|---|---|---|
| 5,864,418 A | * | 1/1999 | Allen et al. | ................ 359/210.1 |
| 2007/0046769 A1 | * | 3/2007 | Park et al. | ..................... 347/235 |

* cited by examiner

*Primary Examiner* — Euncha Cherry
(74) *Attorney, Agent, or Firm* — Staas & Halsey LLP

(57) ABSTRACT

A light scanning unit includes: a light source; a beam deflector to form forward direction and reverse direction scanning lines on an image section and first and second non-image sections respectively disposed at opposite sides of the image section; a reflecting member to reflect the light beam input from the beam deflector; a light detector to receive a first light beam directly input from the beam deflector and a second light beam input via the reflecting member; a control unit to determine whether the scanning line is a forward direction scanning line or a reverse direction scanning line based on signals respectively corresponding to the first and second light beams detected in the light detector, and to control the light source so that a light beam including image information corresponding to a scanning direction of the scanning line can be emitted; and a synchronization adjusting unit to correct an alignment error between the forward direction scanning line and the reverse direction scanning line due to at least one of respective disposition tolerances of the light detector and the reflecting member and a resonance frequency change of the beam deflector correlating to a surrounding environment change.

37 Claims, 6 Drawing Sheets

US 8,115,980 B2

LIGHT SCANNING UNIT, IMAGE FORMING APPARATUS HAVING THE SAME, AND SYNCHRONIZING SIGNAL CALIBRATING METHOD OF THE LIGHT SCANNING UNIT

CROSS-REFERENCE TO RELATED APPLICATION

This application claims benefit of Korean Patent Application No. 10-2008-0089004, filed Sep. 9, 2008 in the Korean Intellectual Property Office, the disclosure of which is incorporated herein by reference.

BACKGROUND OF THE INVENTION

1. Field of the Invention

Apparatuses and a method consistent with aspects of the present invention relate to a light scanning unit having a structure of reciprocating scanning light in forward and reverse directions, an image forming apparatus having the same, and a method of synchronizing signal calibrating of the light scanning unit, and more particularly, to a light scanning unit capable of correcting an alignment error between a forward direction scanning line and a reverse direction scanning line, an image forming apparatus having the same, and a method of synchronizing signal calibrating of the light scanning unit.

2. Description of the Related Art

In general, a light scanning unit is employed in an image forming apparatus such as a laser printer, a digital copier, a facsimile, a barcode reader, etc. The image forming apparatus employing the light scanning unit forms a latent image on an image carrying body through a main scanning by a beam deflector, and a sub scanning by driving of the image carrying body.

The light scanning unit includes a light source generating and emitting a light beam having a predetermined wavelength, and a beam deflector deflecting the emitted light beam. The beam deflector is classified into a rotation type using a rotating body such as a rotating multi surface mirror or a hologram disk to deflect an entering light beam in a direction, and a resonance mirror type using a resonance mirror reciprocatingly rotating in a predetermined angle to reciprocatingly scan an entering light beam in forward and reverse directions.

Unlike in the use of a rotation mirror type, with the resonance mirror type, because the light beam is scanned in the forward direction and the reverse direction when an image signal is applied to the light source, it is important that the light scanning unit of the resonance mirror type correctly determines whether the scanning direction of the light beam is the forward direction or the reverse direction. In the light scanning unit of the resonance mirror type, all of a forward direction scanning line and a reverse direction scanning line is used in order to make the most use of the property of a resonance mirror. Here, if there is an alignment error between the forward direction scanning line and the reverse direction scanning line, an image may be distorted by a scanning line unit. Accordingly, it is necessary to correct an alignment between the forward direction scanning line and the reverse direction scanning line.

If an alignment error between the forward and reverse direction scanning lines of the light scanning unit of the resonance mirror type is to be corrected by a firmware, it is difficult to correct an assembling tolerance caused in manufacturing the light scanning unit and a change of a resonance frequency of the resonance mirror due to an internal temperature increase.

SUMMARY OF THE INVENTION

Accordingly, it is an aspect of the present invention to provide a light scanning unit capable of correcting an alignment error between a forward direction scanning line and a reverse direction scanning line generated due to an assembling tolerance of the light scanning unit or an internal temperature increase through a synchronizing signal calibration of the light scanning unit, an image forming apparatus having the same, and a synchronizing signal calibrating method of the light scanning unit.

An aspect of the present invention provides a light scanning unit, including: a light source to emit a light beam; a beam deflector to deflect the light beam emitted from the light source, and form forward direction and reverse direction scanning lines to an image section and first and second non-image sections respectively disposed at the opposite sides of the image section; a reflecting member disposed at the second non-image section, and to reflect the light beam input from the beam deflector; a light detector disposed at the first non-image section, and to receive a first light beam directly input from the beam deflector and a second light beam input via the reflecting member; a control unit to determine whether the scanning line is a forward direction scanning line or a reverse direction scanning line based on signals respectively corresponding to the first and second light beams detected in the light detector, and to control the light source so that a light beam including image information corresponding to a scanning direction of the scanning line can be emitted; and a synchronization adjusting unit to correct an alignment error between the forward direction scanning line and the reverse direction scanning line due to at least one of respective disposition tolerances of the light detector and the reflecting member and a resonance frequency change of the beam deflector correlating to a surrounding environment change.

The synchronization adjusting unit may include: a storage unit to store a reference value used in correcting the alignment error between the forward direction scanning line and the reverse direction scanning line, and a correction value calculating unit to calculate an alignment error correction value based on the reference value stored in the storage unit and an actual measurement value detected in the light detector.

The reference value may include T11(R) which is a reciprocating distance value of a normal scanning line in a section between the light detector and an end part of the first non-image section, T12(R) which is a reciprocating distance value of a normal scanning line in a section between the reflecting member and an end part of the second non-image section, and T13(R) which is a normal distance value between the light detector and the reflecting member, and wherein the actual measurement value may include T11(M) which is an actual measurement reciprocating distance value of the scanning line in the section between the light detector and the end part of the first non-image section, T12(M) which is an actual measurement reciprocating distance value of the scanning line in the section between the reflecting member and the end part of the second non-image section, and T13(M) which is an actual measurement distance value between the light detector and the reflecting member.

The alignment error correction value may include a first correction margin M11(C) and a second correction margin M12(C) satisfying Expression 1, $$M_{11}(C) = M_{11}(N) + \frac{T_{11}(R) - T_{11}(M)}{2} \text{ and}$$

$$M_{12}(C) = M_{12}(N) + \frac{T_{12}(R) - T_{12}(M)}{2},$$

wherein the synchronization adjusting unit may correct the alignment error between the forward direction scanning line and the reverse direction scanning line due to the respective disposition tolerances of the light detector and the reflecting member based on the first correction margin M11(C) and the second correction margin M12(C) and wherein, M11(N) is a normal margin between a front end synchronizing signal detecting position of the forward direction scanning line and a starting position of the image section adjacent to the first non-image section, and M12(N) is a normal margin between a front end synchronizing signal detecting position of the reverse direction scanning line and a starting position of the image section adjacent to the second non-image section.

The alignment error correction value may include a correction resonance frequency f(C) of the beam deflector satisfying Expression 2, $$f(C) = f_o \times \frac{T_{13}(R)}{T_{13}(M)},$$

wherein the synchronization adjusting unit may correct the alignment error between the forward direction scanning line and the reverse direction scanning line due to the resonance frequency change of the beam deflector depending on the surrounding environment change based on the correction resonance frequency f(C), and wherein, $f_0$ is a normal resonance frequency of the beam deflector.

An aspect of the present invention provides a light scanning unit, including: a light source which emits a light beam; a beam deflector to deflect the light beam emitted from the light source, and form forward direction and reverse direction scanning lines on an image section and first and second non-image sections respectively disposed at the opposite sides of the image section; a first light detector, disposed at the first non-image section, to receive the light beam input from the beam deflector; a second light detector, disposed at the second non-image section, to receive the light beam input from the beam deflector; a control unit to determine whether the scanning line is a forward direction scanning line or a reverse direction scanning line based on signals respectively detected in the first and second light detectors, and to control the light source so that a light beam including image information corresponding to a scanning direction of the scanning line can be emitted; and a synchronization adjusting unit to correct an alignment error between the forward direction scanning line and the reverse direction scanning line due to at least one of respective disposition tolerances of the first and second light detectors and a resonance frequency change of the beam deflector correlating to a surrounding environment change.

The synchronization adjusting unit may include: a storage unit to store a reference value used in correcting the alignment error between the forward direction scanning line and the reverse direction scanning line, and a correction value calculating unit to calculate an alignment error correction value based on the reference value stored in the storage unit and an actual measurement value detected in the first and second light detectors.

The reference value may include T21(R) which is a reciprocating distance value of a normal scanning line in a section between the first light detector and an end part of the first non-image section, T22(R) which is a reciprocating distance value of a normal scanning line in a section between the second light detector and an end part of the second non-image section, and T23(R) which is a normal distance value between the first light detector and the second light detector, and wherein the actual measurement value may include T21(M) which is an actual measurement reciprocating distance value of the scanning line in the section between the first light detector and the end part of the first non-image section, T22(M) which is an actual measurement reciprocating distance value of the scanning line in the section between the second light detector and the end part of the second non-image section, and T23(M) which is an actual measurement distance value between the first light detector and the second light detector.

The alignment error correction value may include a first correction margin M21(C) and a second correction margin M22(C) satisfying Expression 3, $$M_{21}(C) = M_{21}(N) + \frac{T_{21}(R) - T_{21}(M)}{2} \text{ and}$$

$$M_{22}(C) = M_{22}(N) + \frac{T_{22}(R) - T_{22}(M)}{2},$$

wherein the synchronization adjusting unit may correct the alignment error between the forward direction scanning line and the reverse direction scanning line due to the respective disposition tolerances of the first light detector and the second light detector based on the first correction margin M21(C) and the second correction margin M22(C), and wherein, M21(N) is a normal margin between a front end synchronizing signal detecting position of the forward direction scanning line and a starting position of the image section adjacent to the first non-image section, and M22(N) is a normal margin between a front end synchronizing signal detecting position of the reverse direction scanning line and a starting position of the image section adjacent to the second non-image section.

The alignment error correction value may include a correction resonance frequency f(C) of the beam deflector satisfying Expression 4, $$f(C) = f_o \times \frac{T_{23}(R)}{T_{23}(M)},$$

wherein the synchronization adjusting unit may correct the alignment error between the forward direction scanning line and the reverse direction scanning line due to the resonance frequency change of the beam deflector correlating to the surrounding environment change based on the correction resonance frequency f(C), and wherein, $f_0$ is a normal resonance frequency of the beam deflector.

The beam deflector may include a resonance mirror.

An aspect of the present invention provides an image forming apparatus, including: an image carrying body; the light scanning unit to scan a light beam on the image carrying body to form a latent image; a developing unit to develop a visible image to the image carrying body; a transferring unit to transfer the visible image developed in the image carrying body to a printing medium; and a fusing unit to fuse the visible image transferred to the printing medium.

The synchronization adjusting unit may include: a storage unit to store a reference value used in correcting the alignment error between the forward direction scanning line and the reverse direction scanning line, and a correction value calculating unit to calculate an alignment error correction value based on the reference value stored in the storage unit and an actual measurement value detected in the light detector.

The reference value may include T11(R) which is a reciprocating distance value of a normal scanning line in a section between the light detector and an end part of the first non-image section, T12(R) which is a reciprocating distance value of a normal scanning line in a section between the reflecting member and an end part of the second non-image section, and T13(R) which is a normal distance value between the light detector and the reflecting member, and wherein the actual measurement value may include T11(M) which is an actual measurement reciprocating distance value of the scanning line in the section between the light detector and the end part of the first non-image section, T12(M) which is an actual measurement reciprocating distance value of the scanning line in the section between the reflecting member and the end part of the second non-image section, and T13(M) which is an actual measurement distance value between the light detector and the reflecting member.

The alignment error correction value may include a first correction margin M11(C) and a second correction margin M12(C) satisfying Expression 5, $$M_{11}(C) = M_{11}(N) + \frac{T_{11}(R) - T_{11}(M)}{2} \text{ and}$$

$$M_{12}(C) = M_{12}(N) + \frac{T_{12}(R) - T_{12}(M)}{2},$$

wherein the synchronization adjusting unit may correct the alignment error between the forward direction scanning line and the reverse direction scanning line due to the respective disposition tolerances of the light detector and the reflecting member based on the first correction margin M11(C) and the second correction margin M12(C), and wherein, M11(N) is a normal margin between a front end synchronizing signal detecting position of the forward direction scanning line and a starting position of the image section adjacent to the first non-image section, and M12(N) is a normal margin between a front end synchronizing signal detecting position of the reverse direction scanning line and a starting position of the image section adjacent to the second non-image section.

The alignment error correction value may include a correction resonance frequency f(C) of the beam deflector satisfying Expression 6, $$f(C) = fo \times \frac{T_{13}(R)}{T_{13}(M)},$$

wherein the synchronization adjusting unit may correct the alignment error between the forward direction scanning line and the reverse direction scanning line due to the resonance frequency change of the beam deflector depending on the surrounding environment change based on the correction resonance frequency f(C), and wherein, $f_0$ is a normal resonance frequency of the beam deflector.

The beam deflector may include a resonance mirror.

An aspect of the present invention provides an image forming apparatus, including: an image carrying body; the light scanning unit to scan a light beam on the image carrying body to form a latent image; a developing unit to develop a visible image to the image carrying body; a transferring unit to transfer the visible image developed in the image carrying body to a printing medium; and a fusing unit to fuse the visible image transferred to the printing medium.

The synchronization adjusting unit may include: a storage unit to store a reference value used in correcting the alignment error between the forward direction scanning line and the reverse direction scanning line, and a correction value calculating unit to calculate an alignment error correction value based on the reference value stored in the storage unit and an actual measurement value detected in the first and second light detectors.

The reference value may include T21(R) which is a reciprocating distance value of a normal scanning line in a section between the first light detector and an end part of the first non-image section, T22(R) which is a reciprocating distance value of a normal scanning line in a section between the second light detector and an end part of the second non-image section, and T23(R) which is a normal distance value between the first light detector and the second light detector, and wherein the actual measurement value may include T21(M) which is an actual measurement reciprocating distance value of the scanning line in the section between the first light detector and the end part of the first non-image section, T22(M) which is an actual measurement reciprocating distance value of the scanning line in the section between the second light detector and the end part of the second non-image section, and T23(M) which is an actual measurement distance value between the first light detector and the second light detector.

The alignment error correction value may include a first correction margin M21(C) and a second correction margin M22(C) satisfying Expression 7, $$M_{21}(C) = M_{21}(N) + \frac{T_{21}(R) - T_{21}(M)}{2} \text{ and}$$

$$M_{22}(C) = M_{22}(N) + \frac{T_{22}(R) - T_{22}(M)}{2},$$

wherein the synchronization adjusting unit may correct the alignment error between the forward direction scanning line and the reverse direction scanning line due to the respective disposition tolerances of the first light detector and the second light detector based on the first correction margin M21(C) and the second correction margin M22(C), and wherein, M21(N) is a normal margin between a front end synchronizing signal detecting position of the forward direction scanning line and a starting position of the image section adjacent to the first non-image section, and M22(N) is a normal margin between a front end synchronizing signal detecting position of the reverse direction scanning line and a starting position of the image section adjacent to the second non-image section.

The alignment error correction value may include a correction resonance frequency f(C) of the beam deflector satisfying Expression 8, $$f(C) = fo \times \frac{T_{23}(R)}{T_{23}(M)},$$

wherein the synchronization adjusting unit may correct the alignment error between the forward direction scanning line and the reverse direction scanning line due to the resonance frequency change of the beam deflector depending on the surrounding environment change based on the correction resonance frequency f(C), and wherein, $f_0$ is a normal resonance frequency of the beam deflector.

An aspect of the present invention provides a synchronizing signal calibrating method of a light scanning unit having a beam deflector forming forward direction scanning lines and reverse direction scanning lines on an image section and first and second non-image sections respectively disposed at the opposite sides of the image section, a reflecting member reflecting a light beam input from the beam deflector, and a light detector receiving a first light beam directly input from the beam deflector and a second light beam input via the reflecting member, the synchronizing signal calibrating method of the light scanning unit including: calculating a relationship between a normal driving condition and an actual driving condition of the beam deflector, and correcting an alignment error based on the calculated driving conditions of the beam deflector.

The calculating the relationship may include: measuring an actual measurement value which is an actual driving condition of the beam deflector, and calculating an alignment error correction value based on a reference value, which is a driving condition of the beam deflector under a normal condition, and the actual measurement value.

The reference value may include T11(R) which is a reciprocating distance value of a normal scanning line in a section between the light detector and an end part of the first non-image section, T12(R) which is a reciprocating distance value of a normal scanning line in a section between the reflecting member and an end part of the second non-image section, and T13(R) which is a normal distance value between the light detector and the reflecting member, and wherein the actual measurement value may include T11(M) which is an actual measurement reciprocating distance value of the scanning line in the section between the light detector and the end part of the first non-image section, T12(M) which is an actual measurement reciprocating distance value of the scanning line in the section between the reflecting member and the end part of the second non-image section, and T13(M) which is an actual measurement distance value between the light detector and the reflecting member.

The alignment error correction value may include a first correction margin M11(C) and a second correction margin M12(C) satisfying Expression 9, $$M_{11}(C) = M_{11}(N) + \frac{T_{11}(R) - T_{11}(M)}{2} \text{ and}$$
$$M_{12}(C) = M_{12}(N) + \frac{T_{12}(R) - T_{12}(M)}{2},$$

wherein the correcting the alignment error may include correcting an alignment error between the forward direction scanning line and the reverse direction scanning line due to respective disposition tolerances of the light detector and the reflecting member based on the first correction margin M11(C) and the second correction margin M12(C), and wherein, M11(N) is a normal margin between a front end synchronizing signal detecting position of the forward direction scanning line and a starting position of the image section adjacent to the first non-image section, and M12(N) is a normal margin between a front end synchronizing signal detecting position of the reverse direction scanning line and a starting position of the image section adjacent to the second non-image section.

The alignment error correction value may include a correction resonance frequency f(C) of the beam deflector satisfying Expression 10, $$f(C) = fo \times \frac{T_{13}(R)}{T_{13}(M)},$$

wherein the correcting the alignment error may include correcting an alignment error between the forward direction scanning line and the reverse direction scanning line due to a resonance frequency change of the beam deflector correlating to a surrounding environment change based on the correction resonance frequency f(C), and wherein, $f_0$ is a normal resonance frequency of the beam deflector.

The synchronizing signal calibrating method of the light scanning unit may further include comparing the reference value and the actual measurement value, and determining whether to correct a synchronizing signal or not based on the comparing result.

Aspects of the present invention provide a synchronizing signal calibrating method of a light scanning unit having a beam deflector forming forward direction scanning lines and reverse direction scanning lines on an image section and first and second non-image sections respectively disposed at the opposite sides of the image section, and first and second light detectors respectively provided to the first and second non-image sections and receiving a light beam directly input from the beam deflector, the synchronizing signal calibrating method of the light scanning unit including: calculating a relationship between a normal driving condition and an actual driving condition of the beam deflector, and correcting an alignment error based on the calculated driving conditions of the beam deflector.

The calculating the relationship may include: measuring an actual measurement value which is an actual driving condition of the beam deflector, and calculating an alignment error correction value based on a reference value which is a driving condition of the beam deflector under a normal condition, and the actual measurement value.

The reference value may include T21(R) which is a reciprocating distance value of a normal scanning line in a section between the first light detector and an end part of the first non-image section, T22(R) which is a reciprocating distance value of a normal scanning line in a section between the second light detector and an end part of the second non-image section, and T23(R) which is a normal distance value between the first light detector and the second light detector, and wherein the actual measurement value may include T21(M) which is an actual measurement reciprocating distance value of the scanning line in the section between the first light detector and the end part of the first non-image section, T22(M) which is an actual measurement reciprocating distance value of the scanning line in the section between the second light detector and the end part of the second non-image section, and T23(M) which is an actual measurement distance value between the first light detector and the second light detector.

The alignment error correction value may include a first correction margin M21(C) and a second correction margin M22(C) satisfying Expression 11, $$M_{21}(C) = M_{21}(N) + \frac{T_{21}(R) - T_{21}(M)}{2} \text{ and}$$
$$M_{22}(C) = M_{22}(N) + \frac{T_{22}(R) - T_{22}(M)}{2},$$

wherein the correcting the alignment error may include correcting an alignment error between the forward direction scanning line and the reverse direction scanning line due to respective disposition tolerances of the first light detector and the second light detector based on the first correction margin M21(C) and the second correction margin M22(C), and wherein, M21(N) is a normal margin between a front end synchronizing signal detecting position of the forward direction scanning line and a starting position of the image section adjacent to the first non-image section, and M22(N) is a normal margin between a front end synchronizing signal detecting position of the reverse direction scanning line and a starting position of the image section adjacent to the second non-image section.

The alignment error correction value may include a correction resonance frequency f(C) of the beam deflector satisfying Expression 12, $$f(C) = fo \times \frac{T_{23}(R)}{T_{23}(M)},$$

wherein the correcting the alignment error may include correcting an alignment error between the forward direction scanning line and the reverse direction scanning line due to a resonance frequency change of the beam deflector correlating to a surrounding environment change based on the correction resonance frequency f(C), and wherein, $f_0$ is a normal resonance frequency of the beam deflector.

The synchronizing signal calibrating method of the light scanning unit may further include comparing the reference value and the actual measurement value, and determining whether to correct a synchronizing signal or not based on the comparing result.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
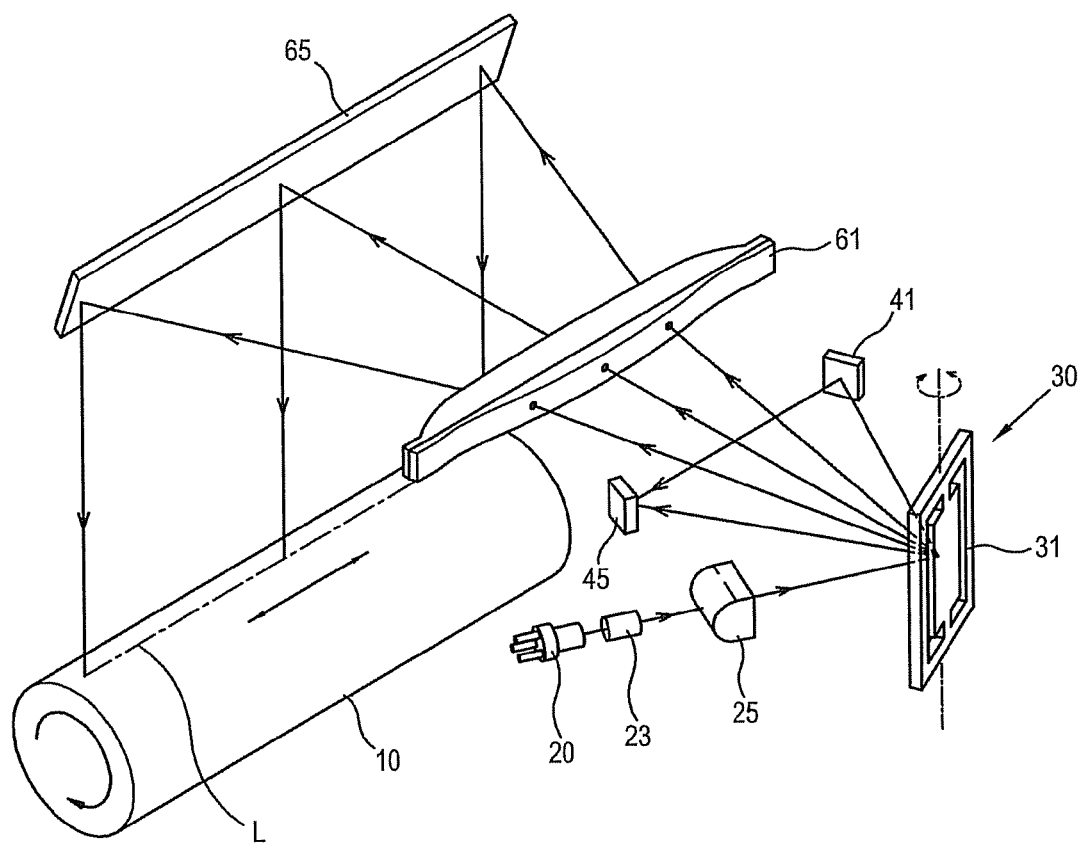
FIG. 1 is a perspective view illustrating a light scanning unit according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
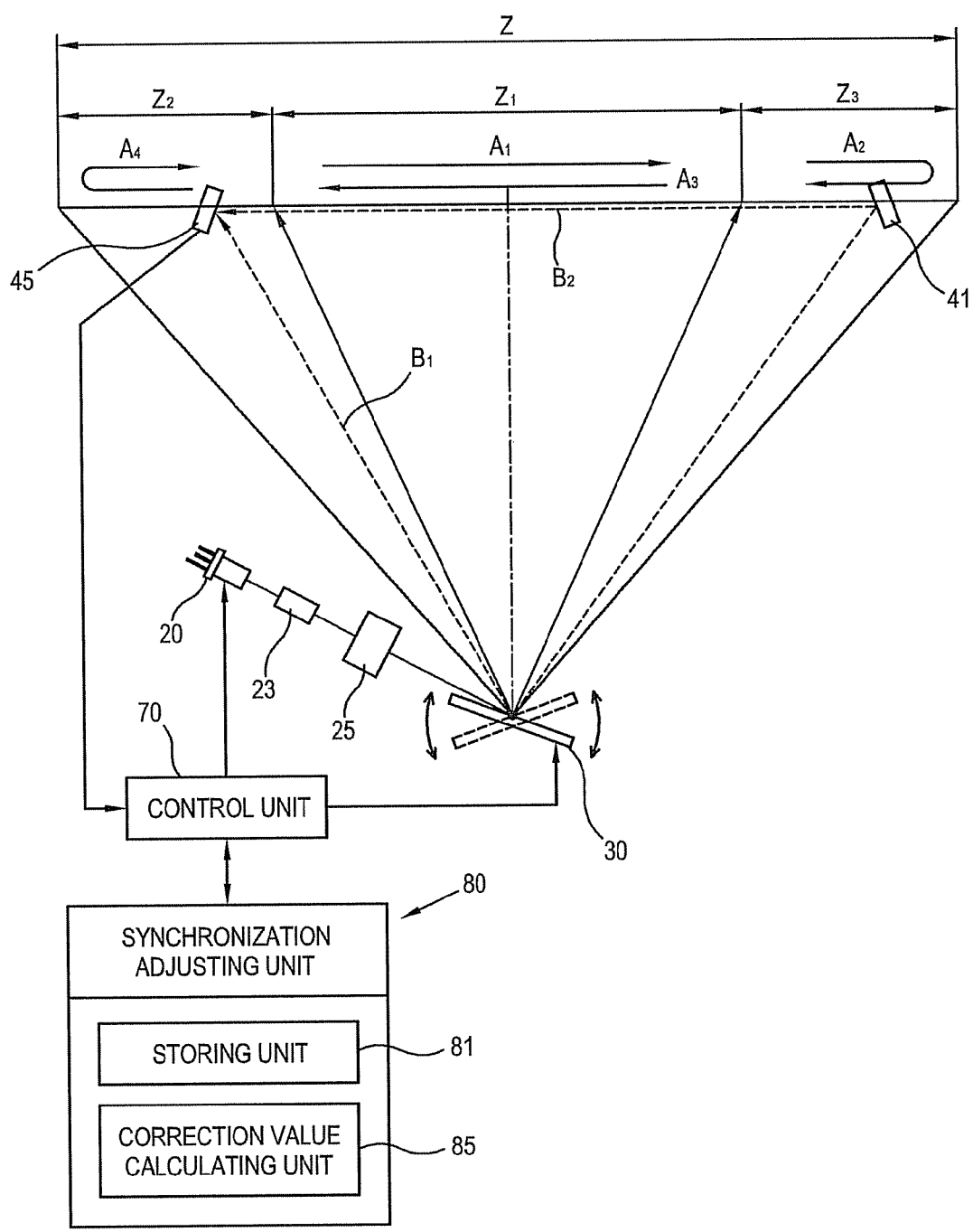
FIG. 2 is a schematic plane view illustrating the light scanning unit according to the exemplary embodiment of the present invention.

FIGS. 1 and 2 are a perspective view and a schematic plane view illustrating a light scanning unit 120 according to an exemplary embodiment of the present invention.

Referring to the figures, the light scanning unit 120 according to the exemplary embodiment of the present invention includes a light source 20 emitting a light beam, a beam deflector 30 reciprocatingly deflecting the light beam emitted from the light source 20 to form a scanning line L to an image carrying body 10, a reflecting member 41 and a light detector 45 determining a scanning direction of the scanning line L and detecting a front end synchronizing signal of an effective image section, a control unit 70 controlling the light source 20 based on a signal detected in the light detector 45, and a synchronization adjusting unit 80 correcting an alignment error between a forward direction scanning line and a reverse direction scanning line.

The light source 20 is implemented as a semiconductor element such as a laser diode emitting light of a predetermined wavelength, etc., and is turned on and off depending on a control of the control unit 70 to emit a light beam corresponding to an input image signal.

The beam deflector 30 reciprocatingly deflects the light beam emitted from the light source 20, and forms the forward direction scanning line and the reverse direction scanning line at an image section $Z_1$, and first and second non-image sections $Z_2$ and $Z_3$ provided to the opposite sides of the image section $Z_1$. For this, the beam deflector 30 may include a resonance mirror 31 disposed to reciprocatingly rotate. The beam deflector 30 is a micro electromechanical system (MEMS) scanner, and deflects the light beam input from the light source 20 in forward and reverse directions as the resonance mirror 31 reciprocatingly rotates. The beam deflector 30 of the resonance mirror type vibrates so as to have a predetermined resonance frequency, that is, a driving frequency to scan a light beam B, and may employ various known configurations.

Here, if the light scanning unit 120 is disposed as shown in FIGS. 1 and 2, the forward direction scanning line refers to a scanning line formed in a direction of arrow $A_1$ in FIG. 2 if the beam deflector 30 rotates clockwise, and the reverse direction scanning line is a scanning line formed in a direction of arrow $A_3$ in FIG. 2 if the beam deflector 30 rotates counterclockwise.

The total section Z of the forward and reverse direction scanning lines L is divided to the image section $Z_1$, and the first and second non-image sections $Z_2$ and $Z_3$ provided to the opposite sides of the image section $Z_1$. The image section $Z_1$ is formed on a central area of the total section Z, and is a section to which a light beam including image value is scanned. Each of the first non-image section $Z_2$ and the second non-image section $Z_3$ is a section to which the light beam B not including an image value is scanned.

Referring to FIG. 2, the reflecting member 41 is disposed at the second non-image section $Z_3$, and reflects a light beam input from the beam deflector 30 to the light detector 45. The light detector 45 is disposed at the first non-image section $Z_2$, and receives a first light beam $B_1$ directly input from the beam deflector 30, and a second light beam $B_2$ input via the reflecting member 41.

The control unit 70 determines whether a scanning direction of a light beam deflected by the beam deflector 30 is the forward direction or the reverse direction based on signals corresponding respectively to the first light beam $B_1$ and the second light beam $B_2$ detected in the light detector 45. Also, the control unit 70 controls the light source 20 so that a light beam having an image value corresponding to the determined scanning direction of the scanning line can be emitted.

The synchronization adjusting unit 80 corrects an alignment error between the forward direction scanning line and the reverse direction scanning line due to at least one of each disposition tolerance of the light detector 45 and the reflecting member 41, and a resonance frequency change of the beam deflector 30 correlating to a surrounding environment change. Here, the synchronization adjusting unit 80 includes a storage unit 81 and a correction value calculating unit 85.

The storage unit 81 stores a reference value used for an alignment error correction between the forward direction scanning line and the reverse direction scanning line. The correction value calculating unit 85 calculates an alignment error correction value based on the reference value stored in the storage unit 81 and an actual measurement value detected in the light detector 45.

The reference value includes distance value $T_{11}(R)$, $T_{12}(R)$ and $T_{13}(R)$ under a normal condition, and the actual measurement value includes distance value $T_{11}(M)$, $T_{12}(M)$ and $T_{13}(M)$ actually measured as the light beam is scanned.

Referring to FIGS. 2 and 3A-3E, each of $T_{11}(R)$ and $T_{11}(M)$ is a reciprocating distance value of a scanning line as arrow $A_4$ indicates. In other words, $T_{11}(R)$ is a reciprocating distance value of a normal scanning line in a section between the light detector 45 and an end part of the first non-image section $Z_2$ which is a section in which a scanning line forming direction is changed from a reverse direction scanning to a forward direction scanning through a direction change of the beam deflector 30, and $T_{11}(M)$ is an actual measurement of a reciprocating distance value of the scanning line obtained through an actual measurement in the section between the light detector 45 and the end part of the first non-image section $Z_2$.

Also, each of $T_{12}(R)$ and $T_{12}(M)$ is a reciprocating distance value of a scanning line as arrow $A_2$ indicates. In other words, $T_{12}(R)$ is a reciprocating distance value of a normal scanning line in a section between the reflecting member 41 and an end part of the second non-image section $Z_3$ which is a section in which the scanning line forming direction is changed from the forward direction scanning to the reverse direction scanning through the direction change of the beam deflector 30, and $T_{12}(M)$ is an actual measurement of a reciprocating distance value of the scanning line obtained through an actual measurement in the section between the reflecting member 41 and the end part of the second non-image section $Z_3$.

Also, each of $T_{13}(R)$ and $T_{13}(M)$ is a distance value between the light detector 45 and the reflecting member 41, and represents a normal distance value and an actual measure distance value.

Figure 3A:
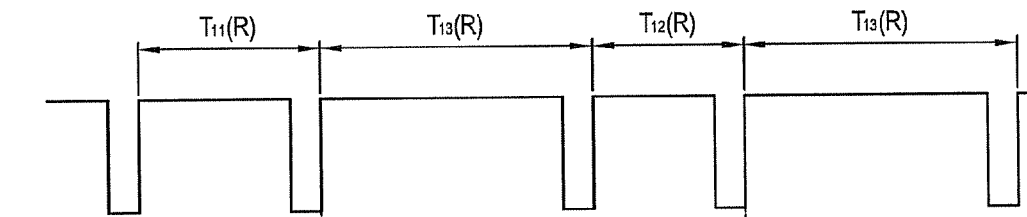
FIG. 3A is a graph illustrating a signal pattern detected through a light detector of an ideal light scanning unit.
Figure 3B:
FIG. 3B illustrates an image section in case of FIG. 3A.

FIG. 3A is a graph illustrating a signal pattern detected through the light detector 45 if there is no effect caused by a mechanical tolerance or an internal environment change in the light scanning unit 120. Also, FIG. 3B illustrates an image section of FIG. 3A, and $M_{11}(N)$ refers to a normal margin between a front end synchronizing signal detecting position of the forward direction scanning line from the light detector 45, and a starting position 1a of the image section $Z_1$ adjacent to the first non-image section $Z_2$, and $M_{12}(N)$ refers to a normal margin between a front end synchronizing signal detecting position of the reverse direction scanning line from the reflecting member 41, and a starting position 1b of the image section $Z_1$ adjacent to the second non-image section $Z_3$.

The actual measured distance value shows a difference from the normal distance value by a mechanical tolerance in disposing the reflecting member and/or the light detector.

Figure 3C:
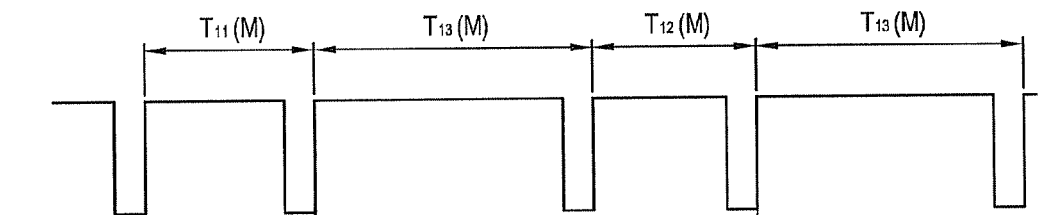
FIG. 3C is a graph illustrating a signal pattern detected through a light detector of a light scanning unit affected by a mechanical tolerance or an internal environment change.

FIG. 3C is a graph illustrating a signal pattern detected through the light detector 45 when being affected by a mechanical tolerance or an internal environment change of the light scanning unit 120. Also, FIGS. 3D and 3E respectively illustrate image sections before and after correction. As shown in FIG. 3E, $M_{11}(C)$ refers to a first correction margin between a front end synchronizing signal detecting position of the forward direction scanning line from the light detector 45, and a starting position 1a of the image section $Z_1$ adjacent to the first non-image section $Z_2$, and $M_{12}(C)$ refers to a second correction margin between a front end synchronizing signal detecting position of the reverse direction scanning line from the reflecting member 41, and a starting position 1b of the image section $Z_1$ adjacent to the second non-image section $Z_3$. Here, the first correction margin $M_{11}(C)$ and the second correction margin $M_{12}(C)$ satisfy the following Expression 1.

$$M_{11}(C) = M_{11}(N) + \frac{T_{11}(R) - T_{11}(M)}{2} \quad \text{Expression 1}$$
$$M_{12}(C) = M_{12}(N) + \frac{T_{12}(R) - T_{12}(M)}{2}$$

For example, the reference value $T_{11}(R)$ may be determined as 6000, and the measurement value $T_{11}(M)$ may be measured as 5500. This indicates that the light detector 45 moves toward an end part of the first non-image section $Z_2$ by $$250 \left( = \frac{6000 - 5500}{2} \right)$$

in comparison to a normal position. Here, since $T_{11}(R)$ and $T_{11}(M)$ are reciprocating distances, a difference value is 250. Also, the reference value $T_{12}(R)$ may be determined as 3000, and the measurement value $T_{12}(M)$ may be measured as 3200. This indicates that the reflecting member 41 moves toward the image section $Z_1$ by 100 in comparison to a normal position.

Figure 3D:
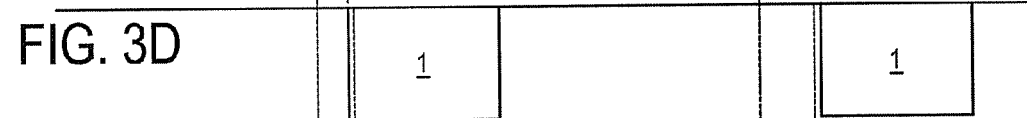
FIGS. 3D and 3E respectively illustrate image sections before and after correction.
Figure 3E:

Additionally, if there is difference between the reference value and the actual measurement value, and if the starting position of the image section $Z_1$ is determined as a normal condition (for example, $M_{11}(N)$=100 and $M_{12}(N)$=1900), the image section $Z_1$ is formed to be shifted to the left by 250 when an image is formed by the forward direction scanning line, as shown in FIG. 3D. Also, the image section $Z_1$ is shifted left by 100 when an image is formed by the reverse direction scanning line. Accordingly, there is an alignment error between the image formed by the forward direction scanning line and the reverse direction scanning line by a value of 150.

If the first correction margin $M_{11}(C)$ and the second correction margin $M_{12}(C)$ are calculated using the above Expression 1, and the position of the front end of the image section $Z_1$ is adjusted with a consideration thereto, the alignment error of the images formed by the forward direction scanning line and the reverse direction scanning line can be corrected.

For example, if the reference value and the actual measurement value are determined, the first correction margin $M_{11}(C)$ becomes $$350\left(=100+\frac{6000-5500}{2}\right),$$

and the second correction margin $M_{12}(C)$ becomes $$1800\left(=1900+\frac{3000-3200}{2}\right).$$

Accordingly, the synchronization adjusting unit 80 determines the starting position of the image section $Z_1$ based on the first correction margin $M_{11}(C)$ and the second correction margin $M_{12}(C)$, thereby correcting an alignment error between the forward direction scanning line and the reverse direction scanning line caused by a disposition tolerance of the light detector 45 and the reflecting member 41.

Also, the alignment error correction value includes a correction resonance frequency of the beam deflector 30 satisfying Expression 2, given below, and an alignment error between the forward direction scanning line and the reverse direction scanning line caused by a resonance frequency change of the beam deflector 30 resulting from on a surrounding environment change and which may be corrected according to the correction resonance frequency f(C).

$$f(C)=f_0\times\frac{T_{13}(R)}{T_{13}(M)} \qquad \text{Expression 2}$$

In Expression 2, $f_0$ is a normal resonance frequency of the beam deflector 30.

For example, if the reference value $T_{13}(R)$ is 7000, and the measurement value $T_{13}(M)$ is 7700, the resonance frequency of the resonance mirror configuring the beam deflector 30 becomes slower than the normal resonance frequency and deteriorates the quality of an image. On the other hand, if $f_0$ is 25 MHz, and $T_{13}(M)$ is measured as described above, the correction resonance frequency f(C) is $$22.7\text{ MHz}\left(=25\text{ MHz}\times\frac{7000}{7700}\right).$$

Accordingly, the resonance frequency of the beam deflector 30 is corrected to f(C) by the synchronization adjusting unit 80, thereby preventing the quality of the image from being deteriorated due to the surrounding environment change.

Also, according to the present exemplary embodiment of the present invention, the light scanning unit 120 may further include a collimating lens 23 and a cylindrical lens 25 disposed on a light path between the light source 20 and the beam deflector 30. The collimating lens 23 collects a light beam emitted from the light source 20 to make the light beam a parallel beam or a converged beam. The cylindrical lens 25 collects an input beam in a direction corresponding to a main scanning direction and/or a sub scanning direction to project the input beam on the beam deflector 30, and may be implemented as at least one lens.

According to the present exemplary embodiment of the present invention, the light scanning unit 120 may further include an f-θ lens 61 disposed between the beam deflector 30 and the image carrying body 10. The f-θ lens 61 is implemented as at least one lens, and corrects light deflected by the beam deflector 30 to have different magnifying powers with respect to the main scanning direction and the sub scanning direction to be projected on the image carrying body 10. Also, a reflecting mirror 65 may be further provided between the f-θ lens 61 and the image carrying body 10. The reflecting mirror 65 reflects a scanning line input from the beam deflector 30 so that the scanning line can be formed on a light exposure surface of the image carrying body 10.

Figure 4:
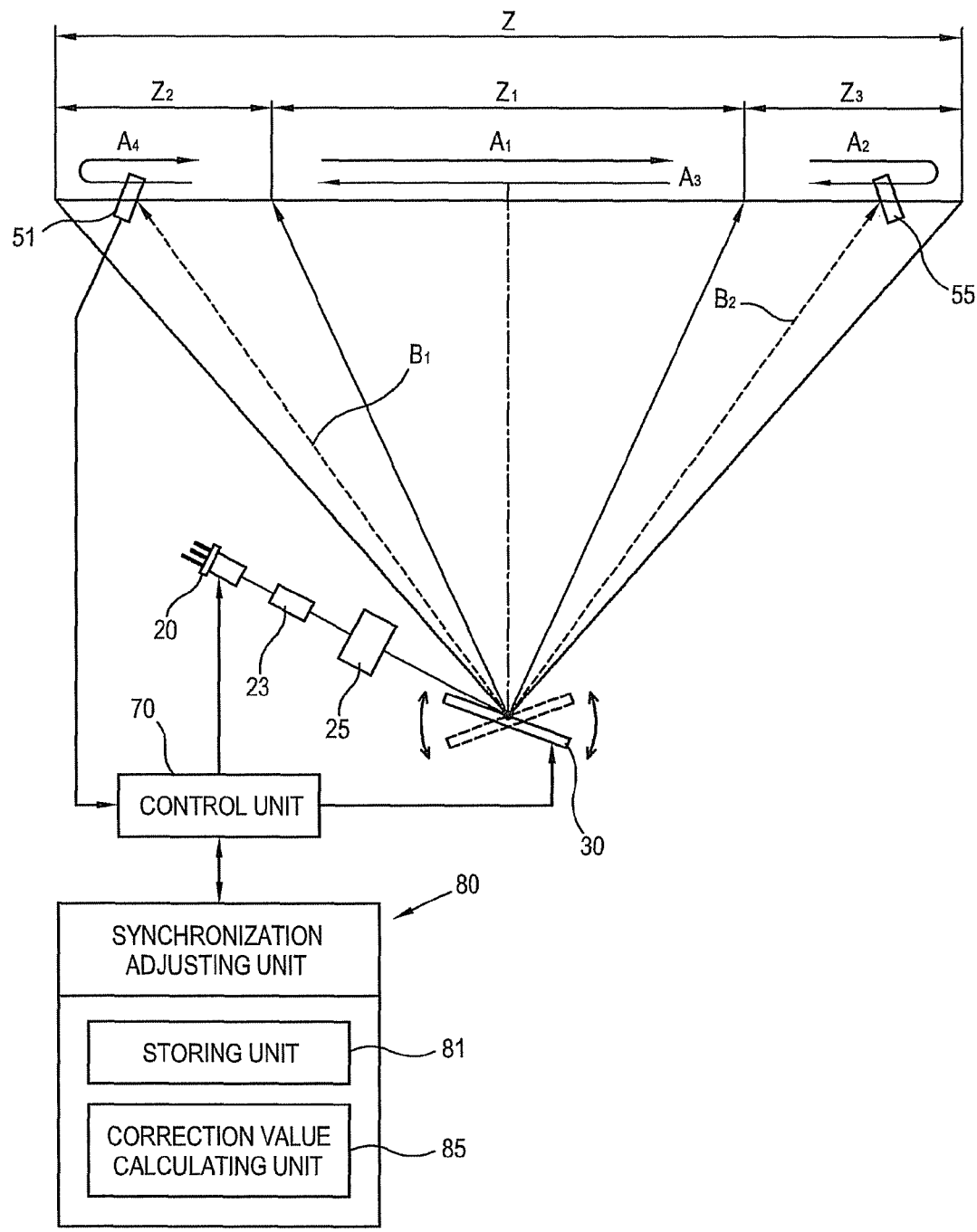
FIG. 4 is a schematic plane view illustrating a light scanning unit according to another exemplary embodiment of the present invention.

FIG. 4 is a schematic plane view illustrating a light scanning unit 120 according to another exemplary embodiment of the present invention.

Referring to FIG. 4, the light scanning unit 120 according to the another exemplary embodiment of the present invention includes a light source 20 emitting a light beam, a beam deflector 30 reciprocatingly deflecting the light beam emitted from the light source 20 to form a scanning line L on an image carrying body 10, first and second light detectors 51 and 55 determining a scanning direction of the scanning line L and detecting a front end synchronizing signal of an effective image section, a control unit 70 controlling the light source 20 based on signals detected in the first and second light detectors 51 and 55, and a synchronization adjusting unit 80 correcting an alignment error between a forward direction scanning line and a reverse direction scanning line.

In comparison with the light scanning unit 120 according to the above exemplary embodiment, the scanning unit, according to the another exemplary embodiment, distinctively includes the first and second light detectors 51 and 55 instead of the reflecting member 41 and the light detector 45, and other elements may have substantially the same configurations and functions as the above exemplary embodiment of the present invention. Accordingly, like elements performing the same or like elements are referred to using the same names and numerals as the elements of the light scanning unit 120 described in preceding exemplary embodiments, and detailed description thereto may be omitted.

The first light detector 51 is disposed at a first non-image section $Z_2$, and receives a first light beam $B_1$ directly input from the beam deflector 30. Also, the second light detector 55 is disposed at a second non-image section $Z_3$, and receives a second light beam $B_2$ directly input from the beam deflector 30.

The control unit 70 controls the light source 20 so that a light beam including the direction of the scanning line and an image value corresponding to the direction can be emitted based on signals respectively corresponding to the first light beam $B_1$ and the second light beam $B_2$ respectively detected in the first and second light detectors 51 and 55.

The synchronization adjusting unit 80 corrects an alignment error between a forward direction scanning line and a reverse direction scanning line due to at least one of disposition tolerances of the first and second light detectors 51 and 55, and a resonance frequency change of the beam deflector 30 occurring due to a surrounding environment change. Here, the synchronization adjusting unit 80 includes a storage unit 81 and a correction value calculating unit 85.

The storage unit 81 stores a reference value used for correcting an alignment error between the forward direction scanning line and the reverse direction scanning line. The correction value calculating unit 85 calculates an alignment error correction value based on the reference value stored in the storage unit 81 and an actual measurement value respectively detected in the first and second light detectors 51 and 55.

Here, the reference value includes distance values $T_{21}(R)$, $T_{22}(R)$ and $T_{23}(R)$ under a normal condition, and the actual measurement value includes distance values $T_{21}(M)$, $T_{22}(M)$ and $T_{23}(M)$ actually measured as the light beam is scanned.

Each of $T_{21}(R)$ and $T_{21}(M)$ is a reciprocating distance value of a scanning line as arrow $A_4$ indicates. That is, $T_{21}(R)$ is a reciprocating distance value of a normal scanning line in a section between the first light detector 51 and an end part of the first non-image section $Z_2$ which is a section in which a direction of a line forming scanning is changed from a reverse scanning direction to a forward scanning direction through a direction change of the beam deflector 30, and $T_{21}(M)$ is an actual measurement of the reciprocating distance value of the scanning line obtained through an actual measurement in the section between the first light detector 51 and the end part of the first non-image section $Z_2$.

Also, each of $T_{22}(R)$ and $T_{22}(M)$ is a reciprocating distance value of a scanning line as arrow $A_2$ indicates. In other words, $T_{22}(R)$ is a reciprocating distance value of a normal scanning line in a section between the second light detector 55 and an end part of the second non-image section $Z_3$ which is a section in which the scanning line forming direction is changed from the forward direction scanning to the reverse direction scanning through the direction change of the beam deflector 30, and $T_{22}(M)$ is an actual measurement reciprocating distance value of the scanning line obtained through an actual measurement in the section between the second light detector 55 and the end part of the second non-image section $Z_3$. Also, $T_{23}(R)$ and $T_{23}(M)$ are distance value between the first light detector 51 and the second light detector 55, and respectively represent a normal distance value and an actual measurement distance value.

A first correction margin $M_{21}(C)$ and a second correction margin $M_{22}(C)$ to correct an error between the reference value and the actual measurement value satisfy Expression 3, shown below.

$$M_{21}(C) = M_{21}(N) + \frac{T_{21}(R) - T_{21}(M)}{2}$$
$$M_{22}(C) = M_{22}(N) + \frac{T_{22}(R) - T_{22}(M)}{2}$$

Expression 3

Here, $M_{21}(C)$ refers to a correction margin between a front end synchronizing signal detecting position of the forward direction scanning line from the first light detector 51, and a starting position of the image section $Z_1$ adjacent to the first non-image section $Z_2$, and $M_{22}(C)$ refers to a correction margin between a front end synchronizing signal detecting position of the reverse direction scanning line from the second light detector 55, and a starting position of the image section $Z_1$ adjacent to the second non-image section $Z_3$.

Accordingly, the synchronization adjusting unit 80 determines the starting position of the image section $Z_1$ based on the first correction margin $M_{21}(C)$ and the second correction margin $M_{22}(C)$, thereby correcting an alignment error between the forward direction scanning line and the reverse direction scanning line caused by a disposition tolerance of the first light detector 51 and the second light detector 55.

The alignment error correction value includes a correction resonance frequency of the beam deflector 30 satisfying Expression 4, shown below, and an alignment error between the forward direction scanning line and the reverse direction scanning line caused by a resonance frequency change of the beam deflector 30 resulting from a surrounding environment change may be corrected based on the correction resonance frequency f(C).

$$f(C) = fo \times \frac{T_{23}(R)}{T_{23}(M)}$$

Expression 4

Accordingly, the resonance frequency of the beam deflector 30 is corrected to f(C) by the synchronization adjusting unit 80, thereby preventing the quality of an image from deteriorating due to the surrounding environment change.

As described above, although a mechanical tolerance changes, a resonance frequency change due to a surrounding environment change, such as an internal temperature increase, etc. are caused, the light scanning units 120 according to the exemplary embodiments of the present invention can correct an alignment error through the synchronization adjusting unit 80, thereby correcting an alignment error of an image formed by a forward direction scanning line and a reverse direction scanning line.

Figure 5:
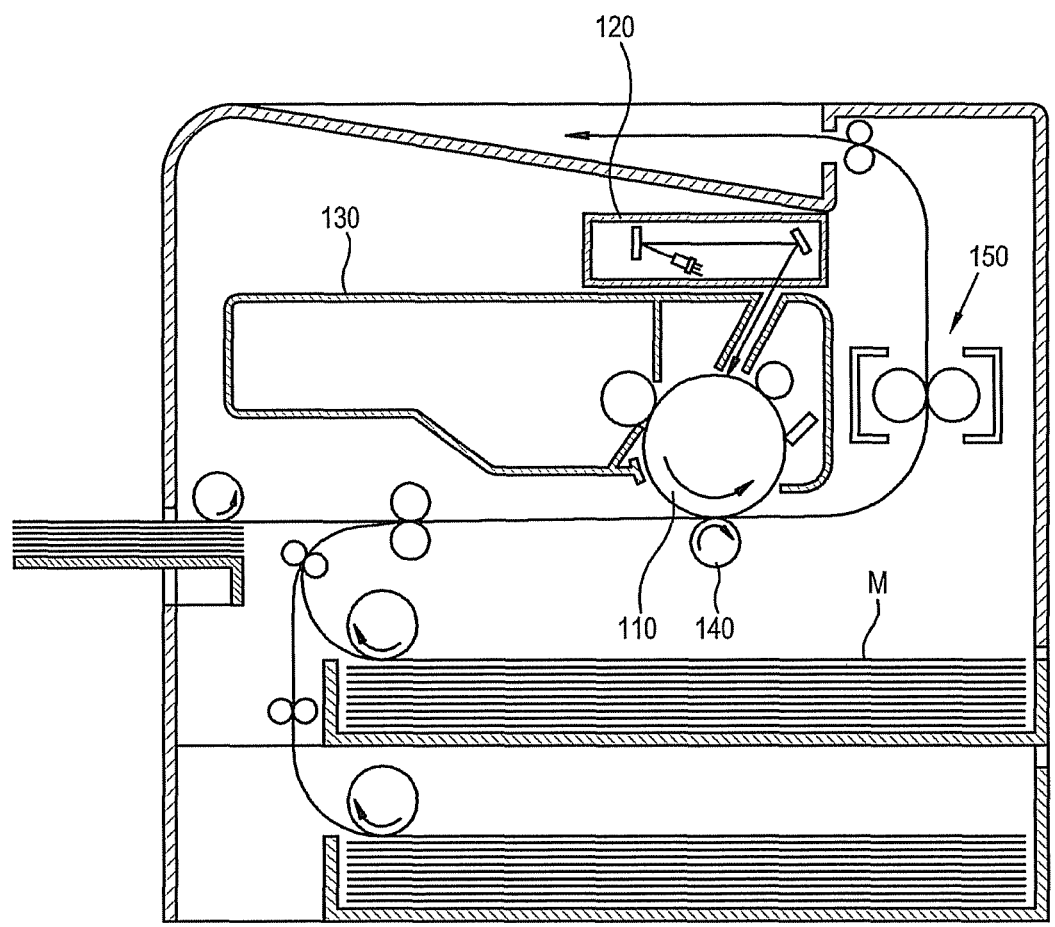
FIG. 5 is a schematic view illustrating an image forming apparatus according to an exemplary embodiment of the present invention.

FIG. 5 is a schematic view illustrating an image forming apparatus according to an exemplary embodiment of the present invention.

Referring to FIG. 5, and according to an embodiment of the present invention as illustrated in FIG. 5, the image forming apparatus includes an image carrying body 110, a light scanning unit 120 scanning a light beam to the image carrying body 110 to form a latent image, a developing unit 130 developing a visible image with respect to the latent image formed on the image carrying body 110, a transferring unit 140 transferring the visible image formed by the developing unit 130 to a printing medium M, and a fusing unit 150 fusing the visible image transferred on the printing medium M.

The light scanning unit 120 deflects a light beam emitted from a light source to form forward direction and reverse direction scanning lines to an image section and non-image sections provided to at opposing sides of the image section. The light scanning unit 120 may have the substantially same configuration as the light scanning unit 120 according to the exemplary embodiments of the present invention described above in FIGS. 1 through 4.

The transferring unit 140 is disposed to face the image carrying body 110 so that the printing medium M transported along a transporting path is interposed therebetween, and transfers a toner image formed on the image carrying body 110 to the transported printing medium M. The fusing unit 150 is provided on a printing path of the image forming apparatus to fuse the toner image transferred to the printing medium M.

As described above, according to the present exemplary embodiment of the present invention, the image forming apparatus employs the light scanning unit including the beam deflector of the resonance mirror type, thereby compacting the total configuration, and reducing the total manufacturing cost. Also, the image forming apparatus can correct an alignment error of an image section generated by reciprocatingly scanning in forward and reverse directions by using the beam deflector of the resonance mirror type, thereby preventing the alignment error of the image section.

Figure 6:
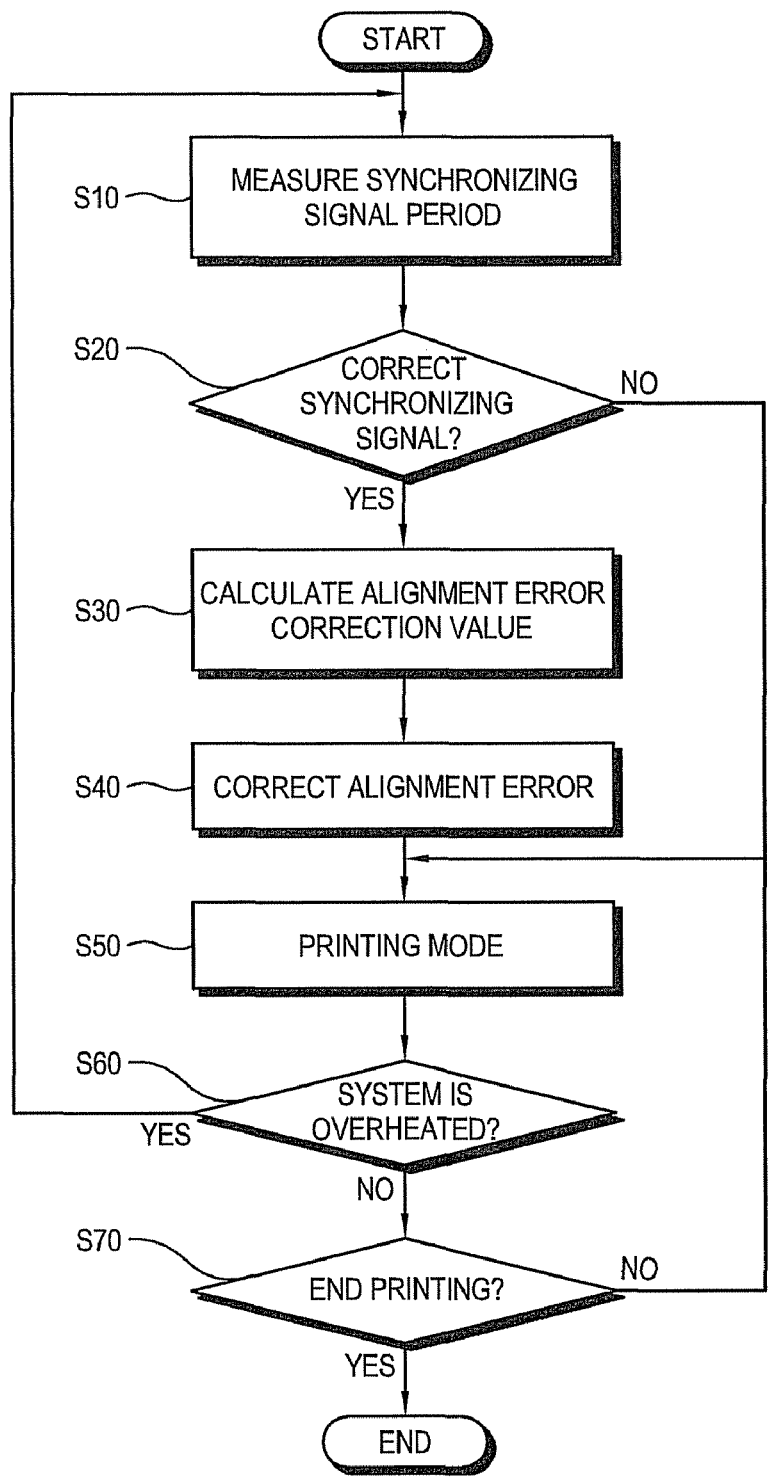
FIG. 6 is a flowchart illustrating a synchronizing signal calibrating method of a light scanning unit according to an exemplary embodiment of the present invention.

FIG. 6 is a flowchart illustrating a synchronizing signal calibrating method of a light scanning unit 120 according to an exemplary embodiment of the present invention.

The synchronizing signal calibrating method according to the exemplary embodiment of the present invention is applied to the light scanning unit 120 according to the exemplary embodiments of the present invention described by referring to FIGS. 1 to 4, and includes an operation of calculating a relationship between a normal driving condition and an actual driving condition of a beam deflector 30 in FIG. 1 or FIGS. 3A-3E, and an operation of correcting an alignment error based on the calculated driving conditions of the beam deflector 30 (S40).

The relationship calculating operation includes an operation of actually measuring a measurement value about the actual driving condition of the beam deflector 30 including a distance value between elements of a scanning line by measuring the period of a synchronizing signal (S10), and an operation of calculating an alignment error correction value (S30). Here, in the alignment error correction value calculating operation (S30), the alignment error correction value is calculated based on a reference value including an optical disposition of an optical element and the driving condition of the beam deflector 30, and the actual measurement value, and is calculated by using the relationship of the above Expressions 1 through 4.

The method according to the present exemplary embodiment of the present invention may further include an operation of comparing the reference value and the actual measurement value, and determining whether to correct the synchronizing signal (S20). The operation S20 is an operation in which the reference value and the actual measurement value are compared to determine whether it is necessary to correct the synchronizing signal or not. If the correction is determined to be necessary, the operation S30 is performed, and if the correction is determined to be unnecessary, a printing mode is directly performed (S50).

Also, if an environment of the light scanning unit 120 changes, for example, due to an internal temperature increase of the light scanning unit 120, the resonance frequency of the beam deflector 30 may be changed. To correct this, the present exemplary embodiment further includes an operation of determining whether a system is overheated or not (S60). In the operation S60, if the system is determined to be overheated, the operations S10 to S40 are repeatedly performed, thereby correcting the resonance frequency of the beam deflector 30 as per Expression 2 or Expression 4. In the operation S60, if the system is not determined to be overheated, it is determined whether a printing ended (S70), and the printing ending or the printing mode is performed depending on the determining result.

As described above, in forming forward and reverse direction scanning lines, although a mechanical tolerance changes, a resonance frequency change due to a surrounding environment change such as an internal temperature increase, etc. are caused, a light scanning unit 120 and a synchronizing signal calibrating method thereof according to the present invention corrects an alignment error through a synchronization adjusting unit, thereby correcting an alignment error of an image formed by the forward direction scanning line and the reverse direction scanning line.

Also, according to an aspect of the present invention, an image forming apparatus employs a light scanning unit 120 including a beam deflector of a resonance mirror type, thereby compacting the total configuration of the image forming apparatus, and reducing the total manufacturing cost of the image forming apparatus.

Although a few embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A light scanning unit, comprising:
a light source to emit a light beam;
a beam deflector to deflect the light beam emitted from the light source, and form forward direction and reverse direction scanning lines on an image section and first and second non-image sections respectively disposed at opposite sides of the image section;
a reflecting member, disposed at the second non-image section, to reflect the light beam input from the beam deflector;
a light detector, disposed at the first non-image section, to receive a first light beam directly input from the beam deflector and a second light beam input via the reflecting member;
a control unit to determine whether the scanning line is a forward direction scanning line or a reverse direction scanning line based on signals respectively corresponding to the first and second light beams detected in the light detector, and to control the light source so that a light beam comprising image information corresponding to a scanning direction of the scanning line can be emitted; and
a synchronization adjusting unit to correct an alignment error between the forward direction scanning line and the reverse direction scanning line due to at least one of respective disposition tolerances of the light detector and the reflecting member and a resonance frequency change of the beam deflector correlating to a surrounding environment change.

2. The light scanning unit according to claim 1, wherein the synchronization adjusting unit comprises:
a storage unit to store a reference value used in correcting the alignment error between the forward direction scanning line and the reverse direction scanning line; and
a correction value calculating unit to calculate an alignment error correction value based on the reference value stored in the storage unit and an actual measurement value detected in the light detector.

3. The light scanning unit according to claim 2,
wherein the reference value comprises:
$T_{11}(R)$ which is a reciprocating distance value of a normal scanning line in a section between the light detector and an end part of the first non-image section,
$T_{12}(R)$ which is a reciprocating distance value of a normal scanning line in a section between the reflecting member and an end part of the second non-image section, and
$T_{13}(R)$ which is a normal distance value between the light detector and the reflecting member; and
wherein the actual measurement value comprises:
$T_{11}(M)$ which is an actual measurement reciprocating distance value of the scanning line in the section between the light detector and the end part of the first non-image section,
$T_{12}(M)$ which is an actual measurement reciprocating distance value of the scanning line in the section between the reflecting member and the end part of the second non-image section, and
$T_{13}(M)$ which is an actual measurement distance value between the light detector and the reflecting member.

4. The light scanning unit according to claim 3, wherein the alignment error correction value comprises a first correction margin $M_{11}(C)$ and a second correction margin $M_{12}(C)$ satisfying Expression 1, $$M_{11}(C) = M_{11}(N) + \frac{T_{11}(R) - T_{11}(M)}{2}$$
$$M_{12}(C) = M_{12}(N) + \frac{T_{12}(R) - T_{12}(M)}{2},$$

wherein the synchronization adjusting unit corrects the alignment error between the forward direction scanning line and the reverse direction scanning line due to the respective disposition tolerances of the light detector and the reflecting member based on the first correction margin $M_{11}(C)$ and the second correction margin $M_{12}(C)$, and wherein, $M_{11}(N)$ is a normal margin between a front end synchronizing signal detecting position of the forward direction scanning line and a starting position of the image section adjacent to the first non-image section, and $M_{12}(N)$ is a normal margin between a front end synchronizing signal detecting position of the reverse direction scanning line and a starting position of the image section adjacent to the second non-image section.

5. The light scanning unit according to claim 4, wherein the alignment error correction value comprises a correction resonance frequency f(C) of the beam deflector satisfying Expression 2

$$f(C) = fo \times \frac{T_{13}(R)}{T_{13}(M)},$$

wherein the synchronization adjusting unit corrects the alignment error between the forward direction scanning line and the reverse direction scanning line due to the resonance frequency change of the beam deflector depending on the surrounding environment change based on the correction resonance frequency f(C), and wherein, $f_o$ is a normal resonance frequency of the beam deflector.

6. The light scanning unit according to claim 1, wherein the beam deflector comprises a resonance mirror.

7. A light scanning unit, comprising:

a light source which emits a light beam;

a beam deflector to deflect the light beam emitted from the light source, and form forward direction and reverse direction scanning lines on an image section and first and second non-image sections respectively disposed at the opposite sides of the image section;

a first light detector, disposed at the first non-image section, to receive the light beam input from the beam deflector;

a second light detector, disposed at the second non-image section, to receive the light beam input from the beam deflector;

a control unit to determine whether the scanning line is a forward direction scanning line or a reverse direction scanning line based on signals respectively detected in the first and second light detectors and to control the light source so that a light beam comprising image information corresponding to a scanning direction of the scanning line can be emitted; and a synchronization adjusting unit to correct an alignment error between the forward direction scanning line and the reverse direction scanning line due to at least one of respective disposition tolerances of the first and second light detectors and a resonance frequency change of the beam deflector correlating to a surrounding environment change.

8. The light scanning unit according to claim 7, wherein the synchronization adjusting unit comprises:

a storage unit to store a reference value used in correcting the alignment error between the forward direction scanning line and the reverse direction scanning line, and a correction value calculating unit to calculate an alignment error correction value based on the reference value stored in the storage unit and an actual measurement value detected in the first and second light detectors.

9. The light scanning unit according to claim 8, wherein the reference value comprises:

$T_{21}(R)$ which is a reciprocating distance value of a normal scanning line in a section between the first light detector and an end part of the first non-image section, $T_{22}(R)$ which is a reciprocating distance value of a normal scanning line in a section between the second light detector and an end part of the second non-image section, and $T_{23}(R)$ which is a normal distance value between the first light detector and the second light detector; and wherein the actual measurement value comprises:

$T_{21}(M)$ which is an actual measurement reciprocating distance value of the scanning line in the section between the first light detector and the end part of the first non-image section, $T_{22}(M)$ which is an actual measurement reciprocating distance value of the scanning line in the section between the second light detector and the end part of the second non-image section, and $T_{23}(M)$ which is an actual measurement distance value between the first light detector and the second light detector.

10. The light scanning unit according to claim 9, wherein the alignment error correction value comprises a first correction margin $M_{21}(C)$ and a second correction margin $M_{22}(C)$ satisfying Expression 3:

$$M_{21}(C) = M_{21}(N) + \frac{T_{21}(R) - T_{21}(M)}{2}$$
$$M_{22}(C) = M_{22}(N) + \frac{T_{22}(R) - T_{22}(M)}{2},$$

wherein the synchronization adjusting unit corrects the alignment error between the forward direction scanning line and the reverse direction scanning line due to the respective disposition tolerances of the first light detector and the second light detector based on the first correction margin $M_{21}(C)$ and the second correction margin $M_{22}(C)$, and wherein, $M_{21}(N)$ is a normal margin between a front end synchronizing signal detecting position of the forward direction scanning line and a starting position of the image section adjacent to the first non-image section, and $M_{22}(N)$ is a normal margin between a front end synchronizing signal detecting position of the reverse direction scanning line and a starting position of the image section adjacent to the second non-image section.

11. The light scanning unit according to claim 10, wherein the alignment error correction value comprises a correction resonance frequency f(C) of the beam deflector satisfying Expression 4:

$$f(C) = f_o \times \frac{T_{23}(R)}{T_{23}(M)},$$

wherein the synchronization adjusting unit corrects the alignment error between the forward direction scanning line and the reverse direction scanning line due to the resonance frequency change of the beam deflector correlating to the surrounding environment change based on the correction resonance frequency f(C), and wherein, $f_o$ is a normal resonance frequency of the beam deflector.

12. The light scanning unit according to claim 7, wherein the beam deflector comprises a resonance mirror.

13. An image forming apparatus, comprising:
an image carrying body;
the light scanning unit according to claim 1 to scan a light beam on the image carrying body to form a latent image;
a developing unit to develop a visible image on the image carrying body;
a transferring unit to transfer the visible image developed in the image carrying body to a printing medium; and
a fusing unit to fuse the visible image transferred to the printing medium.

14. The image forming apparatus according to claim 13, wherein the synchronization adjusting unit comprises:
a storage unit to store a reference value used in correcting the alignment error between the forward direction scanning line and the reverse direction scanning line; and
a correction value calculating unit to calculate an alignment error correction value based on the reference value stored in the storage unit and an actual measurement value detected in the light detector.

15. The image forming apparatus according to claim 14, wherein the reference value comprises:
$T_{11}(R)$ which is a reciprocating distance value of a normal scanning line in a section between the light detector and an end part of the first non-image section,
$T_{12}(R)$ which is a reciprocating distance value of a normal scanning line in a section between the reflecting member and an end part of the second non-image section, and
$T_{13}(R)$ which is a normal distance value between the light detector and the reflecting member; and
wherein the actual measurement value comprises:
$T_{11}(M)$ which is an actual measurement reciprocating distance value of the scanning line in the section between the light detector and the end part of the first non-image section,
$T_{12}(M)$ which is an actual measurement reciprocating distance value of the scanning line in the section between the reflecting member and the end part of the second non-image section, and
$T_{13}(M)$ which is an actual measurement distance value between the light detector and the reflecting member.

16. The image forming apparatus according to claim 15, wherein the alignment error correction value comprises a first correction margin $M_{11}(C)$ and a second correction margin $M_{12}(C)$ satisfying Expression 5:

$$M_{11}(C) = M_{11}(N) + \frac{T_{11}(R) - T_{11}(M)}{2}$$

-continued
$$M_{12}(C) = M_{12}(N) + \frac{T_{12}(R) - T_{12}(M)}{2},$$

wherein the synchronization adjusting unit corrects the alignment error between the forward direction scanning line and the reverse direction scanning line due to the respective disposition tolerances of the light detector and the reflecting member based on the first correction margin $M_{11}(C)$ and the second correction margin $M_{12}(C)$, and wherein, $M_{11}(N)$ is a normal margin between a front end synchronizing signal detecting position of the forward direction scanning line and a starting position of the image section adjacent to the first non-image section, and $M_{12}(N)$ is a normal margin between a front end synchronizing signal detecting position of the reverse direction scanning line and a starting position of the image section adjacent to the second non-image section.

17. The image forming apparatus according to claim 16, wherein the alignment error correction value comprises a correction resonance frequency f(C) of the beam deflector satisfying Expression 6:

$$f(C) = f_o \times \frac{T_{13}(R)}{T_{13}(M)},$$

wherein the synchronization adjusting unit corrects the alignment error between the forward direction scanning line and the reverse direction scanning line due to the resonance frequency change of the beam deflector depending on the surrounding environment change based on the correction resonance frequency f(C), and wherein, $f_o$ is a normal resonance frequency of the beam deflector.

18. The image forming apparatus according to claim 13, wherein the beam deflector comprises a resonance mirror.

19. An image forming apparatus, comprising:
an image carrying body;
the light scanning unit according to claim 7 to scan a light beam to the image carrying body to form a latent image;
a developing unit to develop a visible image on the image carrying body;
a transferring unit to transfer the visible image developed on the image carrying body to a printing medium; and
a fusing unit which fuses the visible image transferred to the printing medium.

20. The image forming apparatus according to claim 19, wherein the synchronization adjusting unit comprises:
a storage unit to store a reference value used in correcting the alignment error between the forward direction scanning line and the reverse direction scanning line; and
a correction value calculating unit to calculate an alignment error correction value based on the reference value stored in the storage unit and an actual measurement value detected in the first and second light detectors.

21. The image forming apparatus according to claim 20, wherein the reference value comprises:
$T_{21}(R)$ which is a reciprocating distance value of a normal scanning line in a section between the first light detector and an end part of the first non-image section,
$T_{22}(R)$ which is a reciprocating distance value of a normal scanning line in a section between the second light detector and an end part of the second non-image section, and $T_{23}(R)$ which is a normal distance value between the first light detector and the second light detector; and wherein the actual measurement value comprises:

$T_{21}(M)$ which is an actual measurement reciprocating distance value of the scanning line in the section between the first light detector and the end part of the first non-image section, $T_{22}(M)$ which is an actual measurement reciprocating distance value of the scanning line in the section between the second light detector and the end part of the second non-image section, and $T_{23}(M)$ which is an actual measurement distance value between the first light detector and the second light detector.

22. The image forming apparatus according to claim 21, wherein the alignment error correction value comprises a first correction margin $M_{21}(C)$ and a second correction margin $M_{22}(C)$ satisfying Expression 7:

$$M_{21}(C) = M_{21}(N) + \frac{T_{21}(R) - T_{21}(M)}{2}$$
$$M_{22}(C) = M_{22}(N) + \frac{T_{22}(R) - T_{22}(M)}{2},$$

wherein the synchronization adjusting unit corrects the alignment error between the forward direction scanning line and the reverse direction scanning line due to the respective disposition tolerances of the first light detector and the second light detector based on the first correction margin $M_{21}(C)$ and the second correction margin $M_{22}(C)$, and wherein, $M_{21}(N)$ is a normal margin between a front end synchronizing signal detecting position of the forward direction scanning line and a starting position of the image section adjacent to the first non-image section, and $M_{22}(N)$ is a normal margin between a front end synchronizing signal detecting position of the reverse direction scanning line and a starting position of the image section adjacent to the second non-image section.

23. The image forming apparatus according to claim 22, wherein the alignment error correction value comprises a correction resonance frequency $f(C)$ of the beam deflector satisfying Expression 8:

$$f(C) = f_o \times \frac{T_{23}(R)}{T_{23}(M)},$$

wherein the synchronization adjusting unit corrects the alignment error between the forward direction scanning line and the reverse direction scanning line due to the resonance frequency change of the beam deflector depending on the surrounding environment change based on the correction resonance frequency $f(C)$, and wherein, $f_o$ is a normal resonance frequency of the beam deflector.

24. A synchronizing signal calibrating method of a light scanning unit having a beam deflector forming forward direction scanning lines and reverse direction scanning lines on an image section and first and second non-image sections respectively disposed at opposite sides of the image section, a reflecting member reflecting a light beam input from the beam deflector, and a light detector receiving a first light beam directly input from the beam deflector and a second light beam input via the reflecting member, the synchronizing signal calibrating method of the light scanning unit comprising:

calculating a relationship between a normal driving condition and an actual driving condition of the beam deflector; and correcting an alignment error based on the calculated driving conditions of the beam deflector.

25. The synchronizing signal calibrating method of the light scanning unit according to claim 24, wherein the calculating the relationship comprises:

measuring an actual measurement value which is an actual driving condition of the beam deflector; and calculating an alignment error correction value based on a reference value, which is a driving condition of the beam deflector under a normal condition, and the actual measurement value.

26. The synchronizing signal calibrating method of the light scanning unit according to claim 25, wherein the reference value comprises:

$T_{11}(R)$ which is a reciprocating distance value of a normal scanning line in a section between the light detector and an end part of the first non-image section, $T_{12}(R)$ which is a reciprocating distance value of a normal scanning line in a section between the reflecting member and an end part of the second non-image section, and $T_{13}(R)$ which is a normal distance value between the light detector and the reflecting member; and wherein the actual measurement value comprises:

$T_{11}(M)$ which is an actual measurement reciprocating distance value of the scanning line in the section between the light detector and the end part of the first non-image section, $T_{12}(M)$ which is an actual measurement reciprocating distance value of the scanning line in the section between the reflecting member and the end part of the second non-image section, and $T_{13}(M)$ which is an actual measurement distance value between the light detector and the reflecting member.

27. The synchronizing signal calibrating method of the light scanning unit according to claim 26, wherein the alignment error correction value comprises a first correction margin $M_{11}(C)$ and a second correction margin $M_{12}(C)$ satisfying Expression 9:

$$M_{11}(C) = M_{11}(N) + \frac{T_{11}(R) - T_{11}(M)}{2}$$
$$M_{12}(C) = M_{12}(N) + \frac{T_{12}(R) - T_{12}(M)}{2},$$

wherein the correcting the alignment error comprises correcting an alignment error between the forward direction scanning line and the reverse direction scanning line due to respective disposition tolerances of the light detector and the reflecting member based on the first correction margin $M_{11}(C)$ and the second correction margin $M_{12}(C)$, and wherein, $M_{11}(N)$ is a normal margin between a front end synchronizing signal detecting position of the forward direction scanning line and a starting position of the image section adjacent to the first non-image section, and $M_{12}(N)$ is a normal margin between a front end synchronizing signal detecting position of the reverse direction scanning line and a starting position of the image section adjacent to the second non-image section.

28. The synchronizing signal calibrating method of the light scanning unit according to claim 27, wherein the alignment error correction value comprises a correction resonance frequency f(C) of the beam deflector satisfying Expression 10:

$$f(C) = fo \times \frac{T_{13}(R)}{T_{13}(M)},$$

wherein the correcting the alignment error comprises correcting an alignment error between the forward direction scanning line and the reverse direction scanning line due to a resonance frequency change of the beam deflector correlating to a surrounding environment change based on the correction resonance frequency f(C), and wherein, $f_o$ is a normal resonance frequency of the beam deflector.

29. The synchronizing signal calibrating method of the light scanning unit according to claim 25, further comprising comparing the reference value and the actual measurement value, and determining whether to correct a synchronizing signal based on the comparing result.

30. A synchronizing signal calibrating method of a light scanning unit having a beam deflector forming forward direction scanning lines and reverse direction scanning lines on an image section and first and second non-image sections respectively disposed at opposite sides of the image section, and first and second light detectors respectively provided to the first and second non-image sections and receiving a light beam directly input from the beam deflector, the synchronizing signal calibrating method of the light scanning unit comprising:

calculating a relationship between a normal driving condition and an actual driving condition of the beam deflector; and correcting an alignment error based on the calculated driving conditions of the beam deflector.

31. The synchronizing signal calibrating method of the light scanning unit according to claim 30, wherein the calculating the relationship comprises:

measuring an actual measurement value which is an actual driving condition of the beam deflector; and calculating an alignment error correction value based on a reference value which is a driving condition of the beam deflector under a normal condition, and the actual measurement value.

32. The synchronizing signal calibrating method of the light scanning unit according to claim 31, wherein the reference value comprises:

$T_{21}(R)$ which is a reciprocating distance value of a normal scanning line in a section between the first light detector and an end part of the first non-image section, $T_{22}(R)$ which is a reciprocating distance value of a normal scanning line in a section between the second light detector and an end part of the second non-image section, and $T_{23}(R)$ which is a normal distance value between the first light detector and the second light detector; and wherein the actual measurement value comprises:

$T_{21}(M)$ which is an actual measurement reciprocating distance value of the scanning line in the section between the first light detector and the end part of the first non-image section, $T_{22}(M)$ which is an actual measurement reciprocating distance value of the scanning line in the section between the second light detector and the end part of the second non-image section, and $T_{23}(M)$ which is an actual measurement distance value between the first light detector and the second light detector.

33. The synchronizing signal calibrating method of the light scanning unit according to claim 32, wherein the alignment error correction value comprises a first correction margin $M_{21}(C)$ and a second correction margin $M_{22}(C)$ satisfying Expression 11:

$$M_{21}(C) = M_{21}(N) + \frac{T_{21}(R) - T_{21}(M)}{2}$$
$$M_{22}(C) = M_{22}(N) + \frac{T_{22}(R) - T_{22}(M)}{2},$$

wherein the correcting the alignment error comprises correcting an alignment error between the forward direction scanning line and the reverse direction scanning line due to respective disposition tolerances of the first light detector and the second light detector based on the first correction margin $M_{21}(C)$ and the second correction margin $M_{22}(C)$, and wherein, $M_{21}(N)$ is a normal margin between a front end synchronizing signal detecting position of the forward direction scanning line and a starting position of the image section adjacent to the first non-image section, and $M_{22}(N)$ is a normal margin between a front end synchronizing signal detecting position of the reverse direction scanning line and a starting position of the image section adjacent to the second non-image section.

34. The synchronizing signal calibrating method of the light scanning unit according to claim 33, wherein the alignment error correction value comprises a correction resonance frequency f(C) of the beam deflector satisfying Expression 12:

$$f(C) = fo \times \frac{T_{23}(R)}{T_{23}(M)},$$

wherein, the correcting the alignment error comprises correcting an alignment error between the forward direction scanning line and the reverse direction scanning line due to a resonance frequency change of the beam deflector correlating to a surrounding environment change based on the correction resonance frequency f(C), and wherein, $f_o$ is a normal resonance frequency of the beam deflector.

35. The synchronizing signal calibrating method of the light scanning unit according to claim 31, further comprising comparing the reference value and the actual measurement value, and determining whether to correct a synchronizing signal based on the comparing result.

36. A method of adjusting a resonance frequency of a light scanning unit of an image forming apparatus, the light scanning unit having a beam deflector forming forward direction scanning lines and reverse direction scanning lines, the method of adjusting the resonance frequency comprising:

determining whether the image forming apparatus is in an overheated state, wherein, if determined that the image forming apparatus is in the overheated state, the method further comprises:

calculating a relationship between a normal driving condition and an actual driving condition of the beam deflector; and correcting an alignment error based on the calculated driving conditions of the beam deflector.

37. A method of driving a resonance frequency of a light scanning unit of an image forming apparatus, the light scanning unit having a beam deflector forming forward direction scanning lines and reverse direction scanning lines, the method of adjusting the resonance frequency comprising:

determining whether an actual driving condition of the beam deflector is a normal driving condition of the beam deflector; and adjusting the actual driving condition of the beam deflector to drive the beam deflector in a normal driving condition if determined that the actual driving condition is not the normal driving condition.

* * * * *

UNITED STATES PATENT AND TRADEMARK OFFICE
CERTIFICATE OF CORRECTION

| | | |
|---|---|---|
| PATENT NO. | : 8,115,980 B2 | Page 1 of 1 |
| APPLICATION NO. | : 12/480141 | |
| DATED | : February 14, 2012 | |
| INVENTOR(S) | : Young-jin Park | |

It is certified that error appears in the above-identified patent and that said Letters Patent is hereby corrected as shown below:

On the Title Page Under Prior Application Data, insert

Item --(30)    Foreign Application Priority Data

Sep. 9, 2008    (KR) ............................... 10-2008-0089004--, therefor.

Signed and Sealed this
Nineteenth Day of June, 2012

David J. Kappos
*Director of the United States Patent and Trademark Office*